(No Model.)
S. M. COLE.
HARROW.
No. 464,726. Patented Dec. 8, 1891.
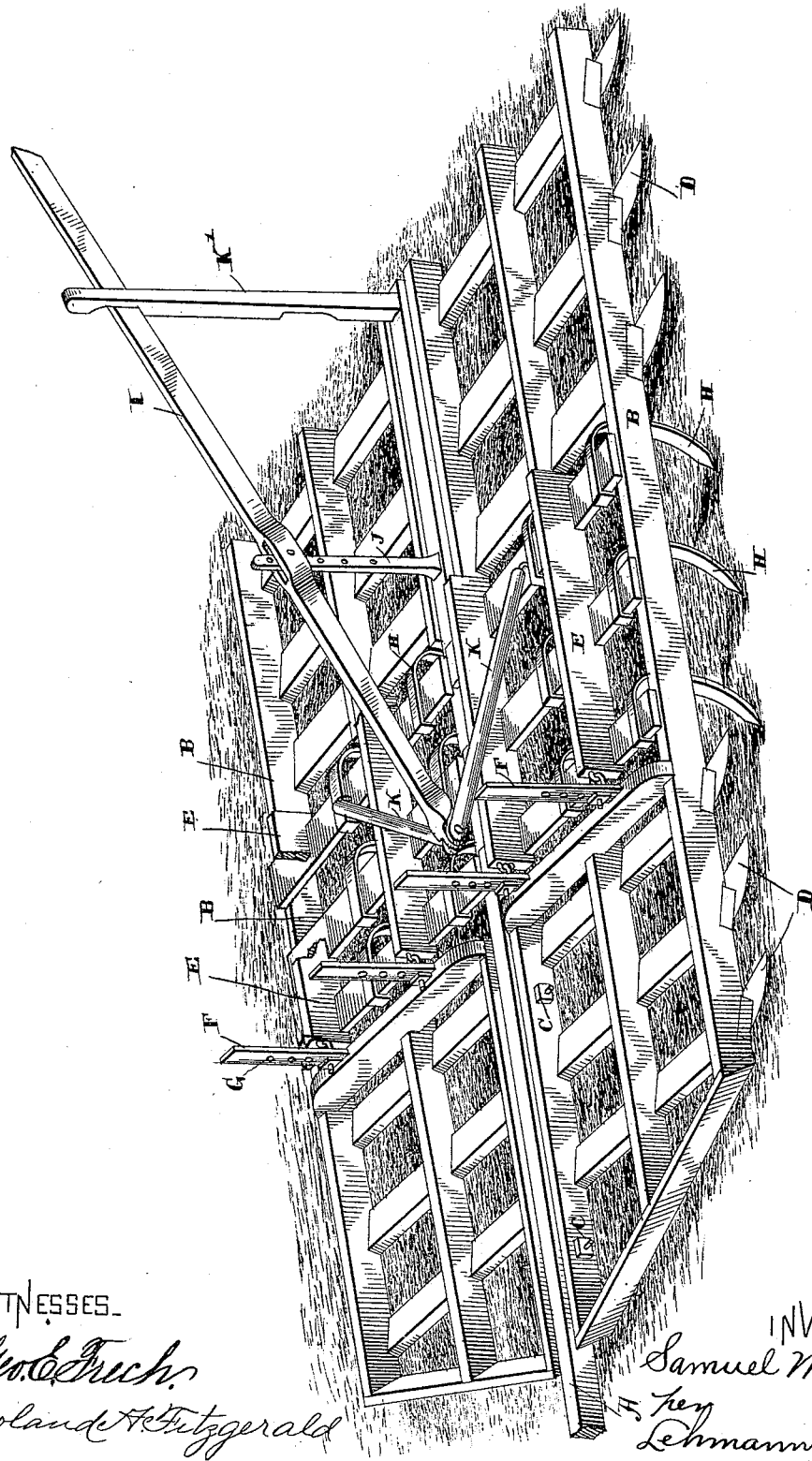
Witnesses:
Geo. E. Frech.
Roland A. Fitzgerald
Inventor:
Samuel M. Cole
By
Lehmann & Pattison
attys.

UNITED STATES PATENT OFFICE.

SAMUEL MARION COLE, OF MANSFIELD, TENNESSEE.

HARROW.

SPECIFICATION forming part of Letters Patent No. 464,726, dated December 8, 1891.

Application filed June 11, 1891. Serial No. 395,905. (No model.)

*To all whom it may concern:*

Be it known that I, SAMUEL MARION COLE, of Mansfield, in the county of Henry and State of Tennessee, have invented certain new and useful Improvements in Harrows; and I do hereby declare the following to be a full, clear, and exact description of the invention, such as will enable others skilled in the art to which it pertains to make and use it, reference being had to the accompanying drawing, which forms part of this specification.

My invention relates to an improvement in harrows; and it consists in the combination and arrangement of parts, which will be fully described hereinafter, and pointed out in the claims.

The object of my invention is to provide a harrow which is very simple in construction and at the same time very effective in accomplishing the work desired.

The accompanying drawing is a perspective view of my improved harrow.

A represents a central draft-pole, to which the side sections B of the harrow are loosely connected by means of the hinges C. The front and rear portions of these side sections B are provided with suitable teeth D. The middle portions of these sections are open, and in these openings are placed the smaller hinged sections E. The latter are hinged to the uprights F on each of the side portions of the harrow. These uprights F are provided with openings G at different heights, so that the depth the teeth of the middle sections are to work can be very readily regulated by changing the hinge connection from one opening to another.

The sections E are preferably provided with spring-teeth H, which assist greatly in loosening the ground, while the smaller teeth pulverize it. As these spring-toothed sections are liable to become clogged with loose weeds and other matter, I have provided a means of lifting the said sections on their hinges, and thus free the teeth from any obstructions that may have caught on them. This is accomplished by means of a lever I, which is pivoted and made adjustable on a standard J, secured to the draft-pole A of the harrow. To the forward end of this pivoted lever are loosely connected the rods K, which are also loosely connected to the rear portions of the hinged sections E. It will readily be seen that by depressing the lever I the sections E are raised on their hinges, and any matter that may have collected thereon will thus be dropped. K' represents a notched standard, by means of which the lever I may be locked in either a raised or a depressed position. Either side of the harrow may be raised on 6c its hinges as a whole, and thus be freed from any obstruction that may be dragging underneath.

A harrow constructed as herein shown and described is very cheap and simple, and, being composed of few parts, is not liable to get out of order. It has been found especially valuable in loosening and pulverizing ground of a cloddy and stubborn nature.

Having thus described my invention, I claim—

1. In a harrow, a central draft-pole, harrow-sections loosely connected thereto, and smaller sections adjustably secured to the main sections, which are adapted to be raised on their hinges in a line with the draft of the harrow, the parts being combined to operate substantially as shown and described.

2. In a harrow, a central draft-pole, hinged harrow-sections secured thereto, smaller sections adjustably secured to the said hinged sections, and a pivoted lever mounted on the draft-pole for raising the said smaller sections, the parts being combined to operate substantially as shown and described.

In testimony whereof I affix my signature, in presence of two witnesses.

SAMUEL MARION COLE.

Witnesses:
T. F. PETTY,
I. B. WILLIAMS.